United States Patent [19]

Goodfellow et al.

[11] Patent Number: 4,747,771
[45] Date of Patent: May 31, 1988

[54] OPERATION OF A PULSE-FIRED BURNER

[75] Inventors: James H. Goodfellow, Dewsbury; Trevor Ward, Kirby Moreside, both of United Kingdom

[73] Assignees: British Gas PLC, London; Hotwork Developments Ltd., West Yorkshire, both of England

[21] Appl. No.: 928,401

[22] Filed: Nov. 10, 1986

[30] Foreign Application Priority Data

Nov. 12, 1985 [GB] United Kingdom ................ 8527894

[51] Int. Cl.$^4$ .......................... F23C 11/04; F23N 5/00
[52] U.S. Cl. .......................................... 431/1; 431/62; 431/2; 431/6
[58] Field of Search ............................ 431/62, 2, 6, 1; 110/191

[56] References Cited

U.S. PATENT DOCUMENTS

| | | | |
|---|---|---|---|
| 3,617,159 | 11/1971 | Arndt | 431/6 |
| 3,887,325 | 6/1975 | Finger et al. | 431/6 |
| 4,260,361 | 4/1981 | Huber | 431/1 |
| 4,353,712 | 10/1982 | Marion et al. | 431/6 X |

Primary Examiner—Larry Jones
Attorney, Agent, or Firm—Oblon, Fisher, Spivak, McClelland & Maier

[57] ABSTRACT

A pulse-fired burner is operated by modulating a fuel supply rate between a pilot level and a main level to provide a flame the level of which modulates respectively between a pilot level during a non-firing phase and a main flame level during a firing phase. Air supplied at a pilot rate is premixed with the fuel before ignition, the pilot air level being sufficient to support combustion of the fuel at the pilot rate but not at the main rate. The supply of fuel is terminated if no flame is sensed.

17 Claims, 3 Drawing Sheets

OPERATION OF A PULSE-FIRED BURNER

FIELD OF THE INVENTION

This invention relates to the operation of a pulse-fired burner.

BACKGROUND OF THE INVENTION

Pulse fired burners are the type which operate between firing and non-firing phases on a cyclical basis, the firing taking place therefore in a series of "pulses" between non-firing. These types of burners are used to heat enclosures such as furnaces and may be incorporated in the wall of the furnace.

Pulse-fired burners usually comprise a combustion chamber for the combustion of fuel (main fuel) with forced-draught combustion air (main air), the chamber having an inlet to receive the main air which may be preheated when the burner, as is very common, forms part of a regenerator and an outlet for discharging the combusted fuel from the combustion chamber to the furnace to be heated. A fuel injector is provided for injecting main fuel (e.g., nautral gas) at a firing or main fuel rate into the combustion chamber during the firing phase, and a pilot burner is also provided for igniting the injected fuel.

The fuel injector takes the form of a pipe which is supplied with main fuel from a suitable source for injection, which takes place usually through a wall of the combustion chamber.

The pilot burner comprises a tube which is supplied with fuel at a pilot level rate premixed with air supplied at a pilot level rate, the pilot fuel/pilot air mixture (pilot flame mixture) being ignited by a ignition device, (for example, a spark ignition device), so that the pilot burner provides a pilot flame at the end of the tube for igniting the fuel injected by the injector. In this case the pilot flame is arranged to be situated at a point where ignition of the injected main fuel is possible.

Main fuel injected by the injector at the main rate is, after ignition, combusted with the main combustion air in the combustion chamber of the burner. As a result flame (main flame) is produced in, and ideally is confined to, the combustion chamber.

The duration of the firing phases (during which main fuel is injected by the injector) may be set by timers which turn the injector fuel supply on at the start of the firing phase and turn the injector fuel supply off at the end of the firing phase.

Alternatively, the duration of the firing phase may be set by a thermostat which turns on the injector fuel supply when the temperature in the furnace is below a preset level and turns the injector fuel supply off when the temperature has reached its preset level.

For safety reasons, a device is provided to check for the presence of the pilot flame at the end of the pilot burner or for the presence of the main flame in the combustion chamber. This device most usually takes the form of a sensor which reacts to certain frequencies of light rays emitted by the flames, (for example, ultra violet). Other types of flame sensing devices may be used, such as thermocouples. In any case, when flame is present the sensor provides a detection signal which serves to maintain the burner operational. Where an ultraviolet sensor is used as the detector, the wall of the chamber is provided with a viewing port situated so that any flame produced by the pilot burner or the main flame resulting from combustion in the combustion chamber is visible externally of the burner both to the naked eye and, more importantly, to the flame sensor which is positioned appropriately. If there is no flame present for detection during either the firing or the non-firing phase, the flame sensor will cease emission of its detection signal, and as a consequence the burner will be shut-down automatically. In this case the fuel supply to the injector will, if the burner is in a firing phase, automatically be turned off to prevent the production of any flame in the combustion chamber. In addition, in most conventional systems the fuel supplied to the pilot burner will also be turned off automatically to prevent the production of a pilot flame.

One problem with this type of safety control is that, as long as a pilot flame is present, the sensor will be satisfied, and the burner will be fired during the firing phase. This could lead to a potentially dangerous situation in the event that the main combustion air for combustion of the main fuel in the combustion chamber cannot for some reason reach the combustion chamber. This might occur as a result of a blockage, for example, in the heat storage bed of the regenerator (where the burner is incorporated in a regenerative heating system). In this case, if the main fuel is still being injected at the main rate, the combustion chamber of the burner, the furnace itself and any further burners may receive this "neat fuel"—which if ignited by accident could explode.

For this reason, pulse-fired burners are usually operated so that, during firing cycles, the pilot flame is extinguished (after the main fuel provided by the injector has been ignited). This can be done simply by turning of the pilot fuel supply. At the end of the firing phase, the pilot fuel supply is turned on again and is reignited.

Furthermore, while under normal circumstances the precautions described should ensure that, in the event that there is a failure of the main combustion air to reach the combustion chamber of the burner during a firing cycle, shut down will automatically ensue, the pilot tube will still be supplied with pilot air even during the firing cycle, as only the pilot fuel supply has been turned off. This, albeit small, supply of air may nevertheless be sufficient, where it impinges on the main fuel emitted by the fuel injector, to promote combustion of the fuel in the region of impingement so as to provide a small flame of sufficient stability to satisfy the flame sensor that a flame is present. Thus shut-down may not follow although the prevailing situation demands it.

In practice the pilot fuel supply will be turned on just before the commencement of the firing phase, reignition of the pilot fuel being necessary of course at this point, and the supply will be turned of just after the beginning of the firing phase.

Apart from imposing a requirement that the pilot burner be interrupted periodically, additional controls are necessary to ensure that the operation of the pilot burner is appropriately out of phase with the operation of the fuel injector.

These controls are subject to heavy use. Particularly in the case where the firing and non-firing phases are of short duration, these controls are overworked and may break down or not maintain the appropriate out of phase situation between operation of the pilot burner and the fuel injector. In either case disastrous results may ensue.

OBJECT OF THE INVENTION

It is therefore an object of the present invention to enable a pulse-fired burner to be operated safely, without the need continuously to interrupt operation of the pilot burner or to provide out of phase operation of the pilot burner with the fuel injector.

SUMMARY OF THE INVENTION

According to one aspect of the present invention, a method is provided for operating a pulse-fired burner, the method comprising modulating a fuel supply rate between a pilot and a main level to provide a flame the level of which modulates respectively between a pilot level during a non-firing phase and a main flame level during a firing phase, supplying air at a pilot rate for premix with the fuel before ignition, the pilot air level being sufficient to support combustion of the fuel at the pilot rate but not at the main rate, premixing the air with the fuel and terminating the supply of fuel, if no flame is sensed.

According to another aspect of the present invention, apparatus is provided for operating a pulse-fired burner, the apparatus comprising means for modulating a fuel supply rate between a pilot and a main level to provide a flame the level of which modulates respectively between a pilot level during a non-firing phase and a main flame level during a firing phase, means for supplying air at a pilot rate for premix with the fuel before ignition, the pilot air level being sufficient to support combustion of the fuel at the pilot rate but not at the main rate, means for premixing the air with the fuel, and means for terminating the supply of fuel if no flame is sensed.

In essence, the invention provides a pilot burner operating alternately as a pilot burner and a fuel injector during non-firing and firing phases respectively. Or, looked at in another way, the invention provides a fuel injector seving alternately as a fuel injector and a pilot burner during firing and non-firing phases respectively. In any case, only one device is necessary to provide a pilot flame and a main flame, the arrangement being that the flame is modulated between a pilot flame and a main flame level during non-firing and firing respectively as the fuel supply rate modulates between a pilot rate and a main rate. There is therefore no need to extinguish the pilot flame during a non-firing phase or to provide controls to maintain the operation of the pilot burner out of phase with the firing of the burner.

While pilot air is deliberately present at all times in the fuel, this air is always premixed with the fuel. We have found that, in this case, even though the air may be present in a quantity sufficient to establish a pilot flame at the outlet of the injector, it can nevertheless be present in a quantity which is insufficient to support combustion of the fuel when injected at the main rate.

Thus, during the burner firing cycle, should the main combustion air fail to reach the combustion chamber for any reason, no combustion of the fuel can occur, and consequently no flame will be present for detection by the flame sensor. The burner will then automatically be shut down as with the conventional operation of pulse-fired burners.

BRIEF DESCRIPTION OF THE DRAWINGS

An embodiment of the invention will now be particularly described with reference to the accompanying drawings in which.

DETAILED DESCRIPTION OF THE PRESENTLY PREFERRED EMBODIMENT

Figure 1:
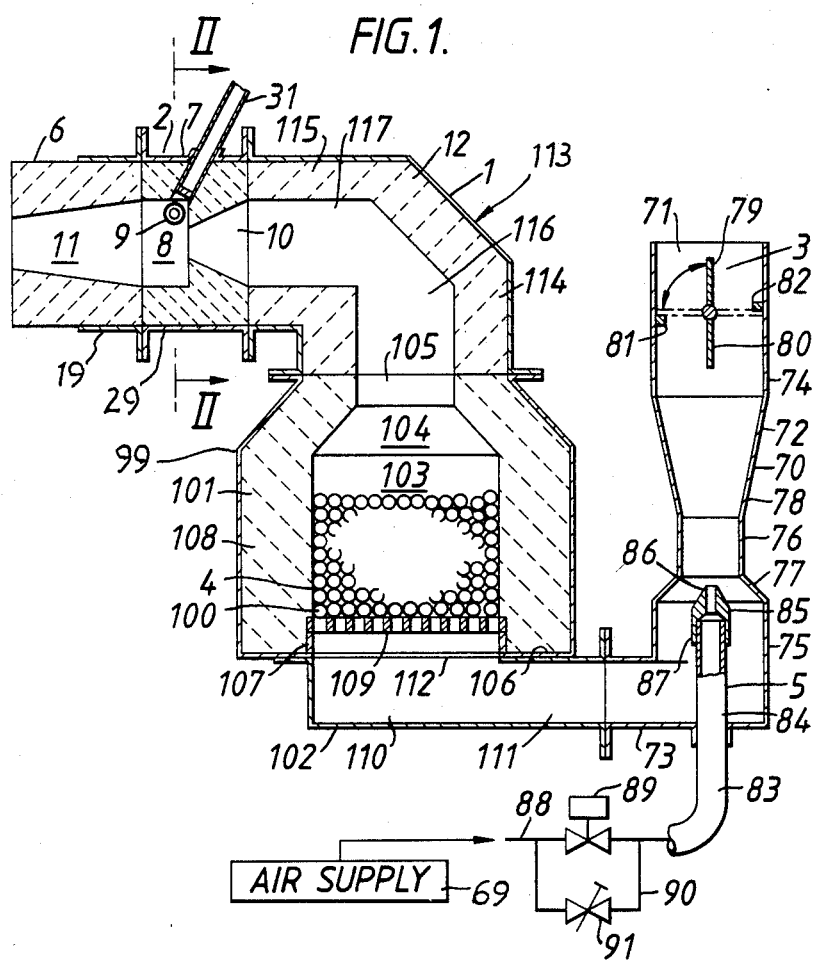
FIG. 1 is a longitudinal section through a regenerator incorporating a pulse-fired type burner.

Referring to the drawings and in particular to FIG. 1, the regenerator 1 incorporates at one end a pulse-fired burner 2 and at the other end a butterfly-type valve 3 for closing off the other end of the regenerator 1. A gas permeable heat storage and release means 4 is disposed between the ends of the regenerator 1 and an air injection means 5 located between the heat storage and release means 4 and the valve 3 for injecting main combustion air into the regenerator 1.

The pulse-fired type burner 2 comprises two adjoining refractory lined ducts 6 and 7. The duct 6 has an outer steel casing 19, and the duct 7 has an outer steel casing 29. The duct 7 forms a cylindrical combustion chamber 8 for receiving fuel from a device 9 serving both as a pilot burner and as a fuel injector respectively during non-firing and firing phases.

The duct 7 has an inlet 10 for receiving main combustion air for combusting fuel supplied by the device 9 during a firing phase. The duct 6 forms an outlet 11 for discharge of the combustion products to a furnace (not shown), the duct 6, in use, being located within an aperture in the wall of the furnace.

Since the burner described is forming part of a regenerator, it can also serve as a flue for the discharge of waste gas from the furnace during a fluing cycle as conventional. In this case the duct 6 provides an inlet from the furnace for the waste gas, and the duct 7 provides an outlet for discharging the waste gas to the remainder of the regenerator 1. The waste gas serves to reheat or preheat respectively the previously cooled or unheated heat storage and release means 4, which can then release its stored heat to preheat main combustion air for supporting combustion of the main fuel during a subsequent firing phase.

The duct 7 adjoins a connector duct 12, and the inlet 10 has a bore tapering inwardly towards the combustion chamber 8 to terminate in a diameter less than that of the combustion chamber 8 for increasing the velocity at which the main combustion air is supplied to the combustion chamber 8. Similarly the outlet 11 has a bore tapering away from the combustion chamber 8 to accelerate the rate at which combustion products are supplied to the furnace.

The combustion chamber 8 is formed by a cylindrical bore part of the duct 7 adjoining the inlet 10 in the duct 7 and the outlet 11 in the duct 6, the diameter of the outlet 11 being similar to that of the combustion chamber 8 where it adjoins the chamber 8.

During a firing cycle, the butterfly valve 3 at the other end of the regenerator 1 is closed, causing air from the air injection means 5 to flow towards the burner 2 by way of the heat storage and release means 4. This preheats the air for combustion with fuel in the combustion chamber 8.

During a fluing cycle, the butterfly valve 3 can be opened (to assume the position shown in FIG. 1) to permit the waste gas and the main combustion air to escape through the other end of the regenerator 1 so that none reaches the burner 2.

The remainder of the regenerator 1 will be described in more detail subsequently.

Figure 2:
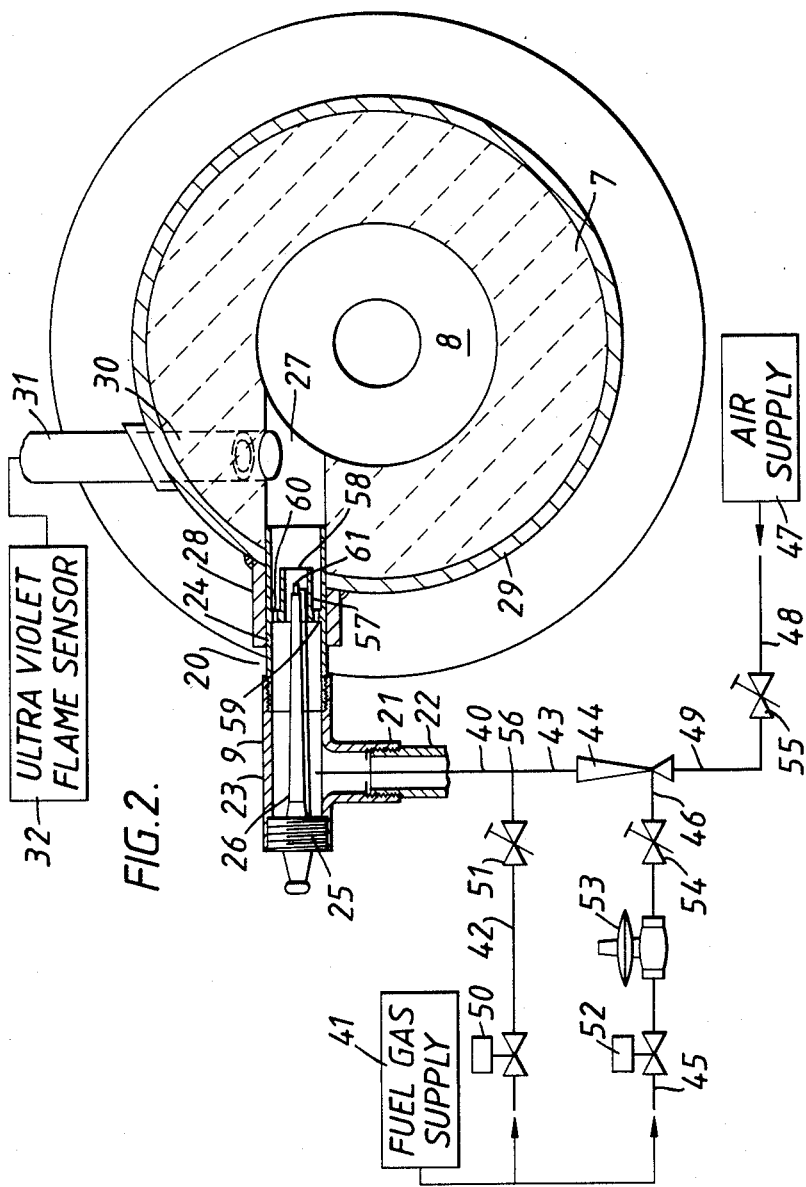
FIG. 2 is a section along lines II—II of FIG. 1 showing, in particular, details of the pilot burner/fuel injector and associated components.

Referring now to FIG. 2, the device 9 comprises a pipe 20 having main portion 23 and a side branch 21 which is internally threaded at its end to receive an externally threaded end of an inlet pipe 22 for receiving fuel premixed with a quantity of pilot air. The main portion 23 of the pipe 20 is internally threaded at one end to receive an externally threaded end of an outlet pipe 24 and at its other end to receive a threaded mounting 25 of an ignition electrode 26.

The outlet pipe 24 extends into a bore 27 in the wall of the duct 7 permitting the outlet pipe 24 to communicate with the combustion chamber 8. The outlet pipe 24 is held within a sleeve 28 welded to the outer steel casing 29 of the duct 7.

A further bore 30 extending through the wall of the duct 7 terminates in the bore 27 at right angles thereto at a position lying between the outlet pipe 24 and the wall of the combustion chamber 8 to provide a port for visual flame inspection, as is conventional, by suitable positioning of the bore 30.

Located within the bore 30 is a viewing tube 31 of known type to permit any flame present at the outlet end of the device 9 or in the combustion chamber 8 to be detected both visually and in the well known manner by means of an ultra-violet sensor 32 suitable aligned with that end of the tube 31 located outside the chamber 8.

Shown schematically in FIG. 2 is a line 40 for supplying a premix of fuel and pilot level air to the inlet pipe 22 of the device 9.

Fuel, in this case natural gas, is supplied to the line 40 from a fuel gas supply 41 by way of a main fuel gas line 42 and an outlet 43 of a mixing chamber 44 in which fuel supplied at a pilot rate and air supplied at a pilot rate are premixed.

Fuel gas is also supplied from the supply 41 by way of a pilot fuel gas line 45 to a first inlet 46 of the chamber 44.

Pilot rate air is supplied from an air supply 47 by way of a pilot air line 48 to a second inlet 49 of the chamber 44.

The main fuel gas line 42 comprises a open-close type solenoid valve 50 and a regulator valve 51 which can be adjusted to set the main fuel gas pressure for providing a main flame. The valve 50 is open during firing phases and is closed during non-firing (e.g., fluing) phases.

The pilot fuel gas line 45 comprises an open-close type solenoid valve 52, a gas pressure governor 53, and a regulator valve 54 which can be adjusted to set the pilot rate gas pressure for providing a pilot flame. The valve 52 is open during both firing and non-firing phases. Both the valve 50 and the valve 52 close of course in the event that, during operation, no flame is sensed by the sensor 32.

The pilot air line 48 comprises only a regulator valve 55 to adjust the pilot air pressure. This is held at a constant pressure to hold the air supply rate constant. It will be seen therefore that pilot air is supplied continuously during operations and even when the burner 2 has been shut down following flame failure.

The chamber 44 is of the venturi-type to promote turbulent mixing of the pilot fuel with the air. The pilot fuel/pilot air mixture after leaving the chamber outlet 43 is mixed with the main fuel gas supplied by the line 42 (during firing) at a function 56 in the line 40.

As we have previously mentioned, the volume of air supplied by the pilot air line 48 should be sufficient to support combustion of the pilot fuel gas to permit the establishment of a pilot flame at the outlet of the pilot burner/fuel injector device 9. However, the volume of the air must be insufficient to support combustion of the main fuel gas supplied during firing by the main fuel gas line 42. Combustion of fuel gas supplied at this rate can only proceed in the presence of main combustion air present in the burner combustion chamber 8.

We have found that, in order to suppress inherent combustion of fuel, particularly natural gas, the fuel/air premix supplied by the line 40 during firing should contain no more than 5% by volume of air based on the total volume of fuel and air. The lower limit is about 2%. Obviously, for the production a pilot flame there should be sufficient air to satisfy stoichemetric combustion requirements of the fuel supplied at the pilot rate.

The ratio of the rates at which the fuel is supplied during the firing phase (when fuel from both lines 42 and 45 is present) and the non-firing phase (when only fuel from the pilot fuel gas line 45 is present) may lie between 30:1 and 50:1 and preferably is 33:1, with the rate of supply of premix pilot air being of course correspondingly chosen to fulfil the requirements described for the establishment of a pilot flame.

Still referring to FIG. 2, located within the outlet pipe 24 of the device 9 is a pilot flame retention member 57 for enabling the pilot flame produced by the device 9 during non-firing to be retained close to the end of the outlet pipe 24.

The pilot flame retention member 57 comprises a stub pipe 58 located within and spaced with clearance from the inner wall of the outlet pipe 24. The rearward end of the stub pipe 58 is circumvented by an annular flange 59 which engages with the inner wall of the outlet pipe 24 and is provided with a number of circumferentially spaced apertures 60. The fuel gas and air mixture therefore reaches the outlet by way both of the stub pipe 58 and the flange 59.

Ignition of the fuel gas/air mixture is provided by the electrode 26 which extends through the pipes 22 and 24 and has a tip 60 terminating within the stub pipe 58, the tip 61 providing a spark discharge to the stub pipe 58 which forms a ground return for the discharge.

In use of the device 9, the flame established at the outlet of the pipe 24 is modulated between a pilot level and a main level by the periodic supply of main fuel by the main fuel gas line 42 during firing phases. The main flame will therefore during firing extend into the burner combustion chamber 8, but only if main combustion air is simultaneously being supplied to the combustion chamber 8. The flame therefore will alternately expand and contract between its main flame and pilot flame levels.

The need to extinguish the pilot flame during non-firing phases is therefore obviated, together with the need for sophisticated pilot interrupt controls to provide out-of-phase operation of a pilot burner with an adjacent fuel injector, since the role of the pilot burner and fuel injector are in effect provided by one device.

As will subsequently be described in detail with reference to FIG. 3, the operation of the main gas solenoid valve 50 and the pilot gas solenoid valve 52 is controlled by the ultraviolet flame sensor 32. When the sensor 32 detects no flame either at the outlet pipe 24 of the device 9 (the pilot flame) during a non-firing phase or in the combustion chamber 8 (the main flame) during a firing phase, both the valve 50 and the valve 52 are closed to prevent any gas entering the burner 2. In other words, the burner shuts down.

Referring to FIG. 1 again, the other end of the regenerator 1 comprises a duct 70 of steel having an opening 71 serving as an outlet for the discharge of waste gas (and air) from the regenerator 1.

The duct 70 has a vertical portion 72 including the outlet opening 71 and a horizontal portion 73 connected to the remainder of the regenerator 1.

The vertical portion 72 includes an uppermost cylindrical part 74 including the opening 71 and the butterfly valve 3, a lowermost cylindrical part 75 connected to the horizontal portion 73, a central cylindrical part 76 of narrower cross section than the parts 74 and 75, a lowermost frusto-conical part 77 connecting the lowermost cylindrical part 75 to the central cylindrical part 76, and an uppermost frustoconical part 78 connecting the uppermost cylindrical part 74 to the central cylindrical part 76.

The butterfly valve 3 has wings 79 and 80 and is mounted for rotation within the uppermost cylindrical part 74. When the valve 3 is in the closed position, the wings 79 and 80 engage respectively with a pair of semi-circular seals 81 and 82 which are secured to the wall of the uppermost cylindrical part 74, the seal 82 being slightly vertically offset above the seal 81. In the closed position, gases are prevented from discharging through the opening 71.

When the valve 3 is rotated to the open position shown in FIG. 1, the valve 3 provides a substantially uninterrupted path for gases flowing through the duct 70 towards and out of the opening 71.

The valve 3 may be rotated between the open and closed positions by means of an electrical solenoid actutator (not shown), although other suitable means for actuating the valve 3 may be used.

The air injection means 5 comprises a pipe 83 having a vertically directed portion 84 extending into the vertical portion 72 of the duct 70 through a horizontal wall of the horizontal portion 73, the pipe 83 terminating in a nozzle or jet 85 which has a tip 86 and a body 87. The nozzle or jet 85 has a bore whose diameter is restricted in comparison to the bore of the pipe 83. The tip 86 of the nozzle 85 (the outer surface of which tapers upwardly away from the body 87 of the nozzle 85 fitted over the end of the pipe 83) terminates in the lowermost frusto-conical portion 77 of the duct 70. The constricted diameter of the bore of the nozzle 85 causes air supplied to the pipe 83 to be accelerated as it leaves the pipe 83. During a fluing phase, this air together with the venturi-type throat formed in the duct 70 by the duct parts 77, 76 and 78 creates a suction tending to suck any furnace waste gas entering the burner 2 towards the duct 70 to provide an accelerated removal of waste gas from the furnace and accelerated transportation of the waste gas to the opening 71. Once the waste gas has entered the central cylindrical part 76, the air discharged from the nozzle 85 tends to blow the waste gas out through the opening 71 in which the valve 3 has assumed its open position.

The pipe 83 is supplied with air from a suitable supply 69 (e.g., a compressed air source). This source may also be the air supply 47 for the pilot air regulator valve 55 shown in FIG. 2. The air supply 69 is connected to the pipe 83 by means of a line 88 which incorporates an open-close solenoid valve 89. Connected across the solenoid valve 89 is a by-pass 90 incorporating a regulator valve 91.

When the solenoid valve 89 is open, air is supplied to the pipe 83 at a high rate suitable to provide sufficient main combustion air to support combustion of the main fuel supplied by the device 9 during a firing phase. This high air flow rate is also maintained during a fluing cycle to assist in the expulsion of waste gas entering the burner 2 to reheat or preheat the heat storage and release means 4 as previously described.

When the solenoid valve 89 is closed, the air is supplied by the by-pass line 90 at a rate controlled by the setting of the regulator valve 91. This rate may be low in comparison to the main flow rate and represents a so-called "standby" rate when the regenerator 1 is in a standby state at which state the burner 2 is held between a firing or a fluing phase, but is neither firing nor fluing and is "standing by" to fire or flue.

In the standby mode of operation, the burner device 9 provides a pilot flame, and the valve 3 is closed. The low volume of air from the air nozzle 85 serves to transport the waste gas produced by the pilot flame to the furnace.

The heat storage and release means 4 comprises a loosely packed heat storage bed 100 of heat storage packing material which may, as is shown, be in the form of balls or like particles of refractory material. The nature of this packing allow gaseous fluid to pass through the heat storage bed 100 in either direction.

The bed 100 is contained within duct 101, comprising a refractory lining 108 and an outer steel casing 99. The duct 101 is connected at its lowermost end to a manifold 102 and at its uppermost end to the connector duct 12.

The duct 101 has a lowermost bore portion 103 which is cylindrical and actually houses the bed 100. The bore portion 103 communicates with a conically tapering intermediate bore portion 104 which terminates upwardly in an uppermost bore portion 105 which is cylindrical and has a diameter which is reduced in size compared to the lowermost bore portion 103.

The outer steel casing 99 of the duct 101 terminates at its lowermost end in an inturned flange 106 which is connected to the manifold 102 and upon which is seated a steel ring 107. The ring 107 is recessed into the inner face of the refractory lining 108 and supports a grid 109 of metal (e.g., steel bars), the grid 109 itself supporting the bed 100 thereabove.

The manifold 102 comprises a plenum chamber 110 leading to a generally horizontal duct 111 which is connected to and communicates with the horizontal portion 73 of the duct 70. The plenum chamber 110 has an opening 112 for communicating with the lowermost bore portion 103 of the duct 101.

The connector duct 12 connects the refractory lined duct 7 to the duct 101 and comprises a refractory lined right angled steel duct 113 having a vertical portion 114 connected to the duct 101 and a horizontal portion 115 connected to the refractory lined duct 7. The vertical portion 114 has a bore 116 the diameter of which is similar to the uppermost bore portion 105 of the duct 101, while the horizontal portion 115 has a bore 117 the diameter of which is similar to the widest diameter of the inlet 10 of the refractory lined duct 7.

Figure 3:
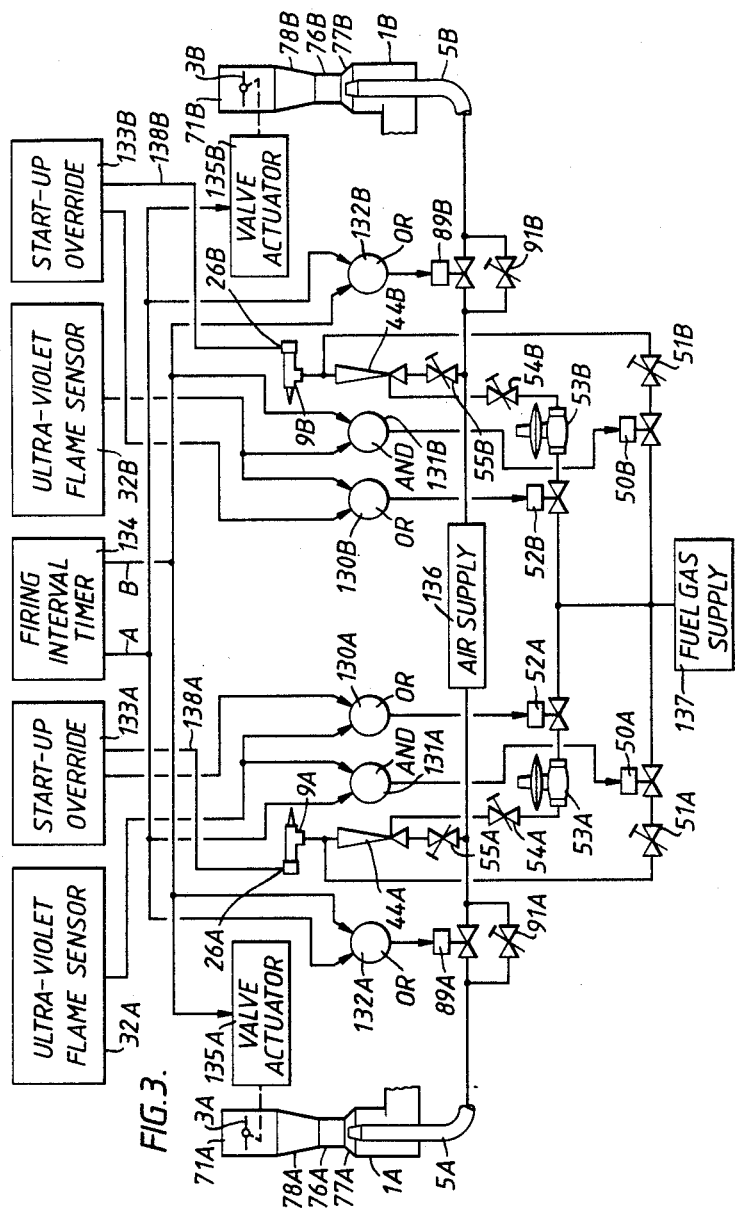
FIG. 3 is a schematic illustration of a electrical control system for a regenerative heating system incorporating two regenerators of the type described in FIG. 1.

Referring to FIG. 3, similar components to those shown in FIGS. 1 and 2 bear the same reference numerals, except that those components forming part of or controlling one regenerator have an "A" suffix after the respective number while those components forming part of or controlling the other regenerator have a "B" suffix after the respective number.

In FIG. 3, OR gates 130A and 130B control the pilot gas solenoid valves 52A and 52B, AND gates 131A and 131B control the main gas solenoid valves 50A and 50B, and further OR gates 132A and 132B control the main air solenoid valves 89A and 89B.

An enabling signal from the OR gates 130 will open their respective pilot gas valves 52. An enabling signal from the AND gates will open respective main gas valves 50. Finally, an enabling signal from the OR gates 132 will open their respective main air valves 89.

The pilot gas OR gates 130A and B are enabled by a signal from the respective ultra-violet sensor 32A and B OR from a respective start-up override 133A and 133B.

The main gas AND gates 131A and B are enabled when there is a signal from the respective ultraviolet sensor 32A and B and from the respective line (A or B) from a firing interval timer 134.

The main air OR gates 132 are enabled when a signal is present either on line A *or* line B of the timer 134.

The start-up overrides 133A and B are conventional, and both must be set to initiate operations. Apart from controlling an OR gate, each override 133 when set causes a respective burner electrode 26A or B to produce sparks to ignite the pilot mixture emitted from the outlet of the device 9A or 9B. After a predetermined period, each override 133 is reset automatically.

The firing interval timer 134 is also conventional and controls the firing interval of each burner. The firing interval for the regenerator 1A is controlled by the length of time during which a signal is placed on line A of the timer 134, while the firing interval for the regenerator 1B is controlled by the length of time a signal is placed on line B of the timer 134. The arrangement is such that, when there is a signal on one of the timer lines, there is no signal on the other timer line. In this event, one regenerator will be firing while the other will be fluing as is conventional. Periodically the regenerator roles are reversed by reversing the signal from one line to the other. This reversal process takes place automatically according to a predetermined firing sequence. However, in addition, the timer 134 can be manually or automatically set to a state where there is no signal either on line A or line B. In this case, each regenerator 1 will assume the standby mode previously described in which neither regenerator is firing or fluing, but each device 9 is emitting a pilot flame.

Each regenerator valve 3 is controlled by a valve actuator 135A (for regenerator 1A) and 135B (for regenerator 1b). The valve actuators 135 can be a solenoid or similar device.

In the arrangement shown in FIG. 3, the valve actuator 135A is controlled by line B of the timer 134 such that, when there is a signal on line B, the valve actuator 135A is actuated to cause the valve 3A to open. Similarly, the valve actuator 135B is controlled by line A of the timer 134 such that, when there is a signal on line A the valve actuator 135B is actuated to cause the valve 3B to open. The valves 3 close of course when there is no signal on their respective timer control lines.

Air both for the pilot burner/fuel injector devices 9A and 9B and for the air injection means 5A and 5B is supplied by a central supply source 136.

Fuel gas for the devices 9A and 9B is supplied by a central fuel source 137.

To initiate operation of the system described, both overrides 133A and 133B must be set. This action causes both pilot gas valves 52A and 52B to open, permitting pilot gas and pilot air to mix in the respective chambers 44A and 44B. Each chamber 44A and 44B is of course supplied continuously with pilot air by means of its own pilot air regulator valve 55A or 55B.

Setting of the overrides 133A and B causes a current to flow on lines 138A and 138B respectively to activate the electrodes 26 in the respective devices 9A and 9B to spark and ignite the pilot fuel/pilot air mixture entering the devices 9A and B from the respective chambers 44A and B. Hence, both devices 9A and 9B produce pilot flames. The overrides 133A and B then automatically reset.

Suppose that the regenerator 1A is to fire and the regenerator 1B is to flue. In that case, there will be a signal on line A of the timer 134, but no signal on line B of the time 134.

Since ultraviolet sensor 32A is sensing a pilot flame from its device 9A and there is a signal on timer line A, the AND gate 131A will be enabled to open the main gas valve 50A to enable main gas to be mixed with the pilot gas/pilot air mixture downstream of the chamber 44A.

In addition, since there is a signal on line A of the timer 134, both OR gates 132A and B will be enabled to open the respective main air valves 89A and B in each regenerator 1A and 1B.

Finally, since there is a signal on line A of the timer 134 but no signal on line B of the timer 134, the valve actuator 135B will be actuated to open its respective valve 3B, but the valve actuator 135A will not be actuated so that its valve 3A will be closed. Consequently, the main air in regenerator 1A will be forced to flow towards the burner combustion chamber 8A by way of the heat storage bed 100A, and the air will support combustion of the main gas/pilot air mixture leaving the outlet of the device 9A. The pilot flame will therefore expand to the level of a main flame in the combustion chamber 8A. The combustion products so produced will enter the furnace to provide heating of the furnace enclosure.

Since the valve 3B is open, the main air in the regenerator 1B will leave the regenerator 1B by way of the opening 71B. Waste gas (produced by the burner of the regenerator 1A) will enter the regenerator 1B and will be drawn through the heat storage bed 100B by the suction effect produced by the injection of main air into the venturi formed by the duct parts 76B, 77B, and 78B in the regenerator 1B. The bed 100B will therefore be preheated by the waste gas, which will eventually be expelled through the opening 71B with the assistance of the main air.

When the regenerator 1B is to fire, the regenerator 1A must flue, and in this case there will be a signal on line B but no signal on line A.

In this case, of course, the main gas valve 50B is opened by an enabling signal from the AND gate 131B, while the main gas valve 50A closes due to the lack of an enabling signal on the AND gate 131A.

Both the main air valves 89A and B remain open, however, since the OR gates 132A and B are not enabled by a signal from timer line B.

However, the valve 3B is now closed, since its valve actuator 135B is no longer actuated by a signal on timer line A, while the valve 3A is now open, since its valve actuator 135A is actuated by a signal on timer line B. In this case, therefore, the pilot flame in the device 9B expands to a main flame level which provides combustion products for the furnace, while the flame in the device 9A contracts to a pilot level.

The main air for combustion of the main fuel/pilot air mixture in the device 9B is of course preheated by heat released from the previously heated heat storage bed 100B in the regenerator 1B.

Waste gas entering the regenerator 1A preheats the heat storage bed 100A before leaving the opening 71A in the regenerator 1A.

Should it be necessary to terminate firing temporarily during operation (because, for instance, the furnace interior has temporarily at least reached a desired temperature), both the regenerators 1A and B can be placed in the standby mode previously described. In this case, there will be no signal on either of the timer lines A and B, so neither of the AND gates 131A or B is enabled, and consequently both main gas valves 50A and B are closed.

If a pilot flame is detected by the sensors 32A and 32B, both the pilot gas valves 52A and B will be open, since the OR gates 130A and B will be enabled. The main air valves 89A and B will both be closed, since the OR gates 132A and B will not be enabled because there is no signal on timer line A or B.

Similarly, both the valves 3A and 3B will be closed, since the valve actuators 135A and 135B will not be activated. Consequently, both the device 9A and B will be operating in the pilot mode, and only a trickle of air will reach the regenerators 1A and B from their respective air injection means 5 by way of the regulator valves 91A and B. This trickle level air will serve merely to assist in transporting the combustion products resulting from the pilot flames into the furnace.

If during firing the main flame in the respective regenerator 1A or 1B is extinguished for any reason, the respective main gas valve 50A or 50B will close automatically, as the respective AND gate 131A or 131B will no longer be enabled. Similarly, the respective pilot gas valve 52A or 52B will also close, since the respective OR gate 130A or 130B will no longer be enabled. If no flame is sensed during a fluing or standby phase, the respective pilot gas valve 52A or 52B will also close, since the respective OR gate 130A or 130B will no longer be enabled.

In order to restart operations, the relevant start up override 133A or 133B must be reset.

We claim:

1. A method of operating a pulse-fired burner of the type comprising:
    (a) a combustion chamber having an inlet to receive air during a firing phase of the burner for the combustion of fuel;
    (b) an outlet for discharging the combusted fuel; and
    (c) a fuel injector having an outlet arranged to inject fuel into the combustion chamber,
said method comprising the steps of:
    (d) supplying fuel to the injector;
    (e) modulating the rate at which the fuel is supplied to the injector between a first lower rate during a non-firing phase of the burner and a second higher rate during a firing phase of the burner;
    (f) supplying air for premix with the fuel before ignition at a rate which is sufficient only to support combustion of the fuel at the lower rate of supply;
    (g) premixing the air with the fuel before ignition;
    (h) igniting the fuel during a non-firing phase;
    (i) sensing the presence of a flame at the injector outlet; and
    (j) terminating the supply fuel to the injector if no flame is sensed.

2. A method as claimed in claim 1 in which the quantity of air premixed with the fuel at the higher rate is no more than 5% by volume of the air based on the total volume of the fuel and the air.

3. A method as claimed in claim 2 in which the quantity of air premixed with the fuel at the higher rate is at least 2% by volume of the air based on the total volume of the fuel and the air.

4. A method as claimed in claim 1 in which the ratio of the rates at which fuel is supplied at the higher level and at the lower level lies between 30:1 and 50:1.

5. A method as claimed in claim 4 in which the ratio is 33:1.

6. A method as claimed in claim 1 in which:
    (a) the fuel is supplied at the lower rate by a first valve for premixing with the air;
    (b) the fuel is supplied at the higher rate by a second valve for subsequent mixing with fuel/air mixture;
    (c) the second valve is closed during non-firing cycles; and
    (d) both the first valve and the second valve are closed when no flame is sensed.

7. A method as claimed in claim 6 in which:
    (a) the fuel supplied at the lower rate and the air are mixed in a chamber and
    (b) the fuel supplied at the lower rate and the air are subsequently mixed with the fuel supplied at the higher rate if the fuel supplied at the higher rate is supplied by the second valve.

8. A method as claimed in either of claims 6 or 7 in which the first and second valves are served from the same fuel source.

9. A method as claimed in claim 8 in which the air is supplied by a regulator valve.

10. A method as claimed in claim 9 in which the air is supplied at a substantially constant rate.

11. A pulse-fired burner comprising:
    (a) a combustion chamber having an inlet to receive air during a firing phase of the burner for combustion of fuel;
    (b) an outlet for discharging the combusted fuel;
    (c) a fuel injector having an outlet arranged to inject fuel into said combustion chamber;
    (d) first means for supplying fuel to said fuel injector;
    (e) second means for modulating the rate at which the fuel is supplied to said fuel injector between a first lower rate during a non-firing phase of the burner and a second higher rate during a firing phase of the burner;
    (f) third means for supplying air for premix with the fuel before ignition at a rate which is sufficient only to support combustion of the fuel at the lower rate of supply;
    (g) fourth means for premixing the air with the fuel before ignition;
    (h) fifth means for igniting the fuel during a non-firing phase;
    (i) sixth means for sensing the presence of a flame at said outlet of said fuel injector; and
    (j) seventh means for terminating the supply of fuel to said injector if no flame is sensed.

12. Apparatus as claimed in claim 11 in which said second means comprises valve means operable to modulate the fuel supply rate between the two rates and to close in the event that no flame is sensed by said sixth means.

13. Apparatus as claimed in claim 12 in which said valve means comprises:
    (a) a first valve operable to supply fuel at the lower rate for premixing with the air in said fourth means;
    (b) a second valve operable to supply fuel at the higher rate for subsequent mixing with the fuel/air mixture;
    (c) eighth means for closing said second valve during non-firing cycles; and
    (d) ninth means for closing both valves when no flame is sensed.

14. Apparatus as claimed in claim 13 in which said fourth means comprises a chamber having:
    (a) an inlet for receiving fuel from said first valve;
    (b) an inlet for receiving the air; and
    (c) an outlet for discharging fuel/air mixture for subsequent mixing with the fuel at the higher rate when supplied by said second valve.

15. Apparatus as claimed in claim 14 in which said first and second valves are served from the same fuel source.

16. Apparatus as claimed in claim 11 in which said third means comprises a regulator valve.

17. Apparatus as claimed in claim 16 in which said regulator valve is adapted to supply the air at a substantially constant rate.

* * * * *